United States Patent [19]
Palmieri

[11] 3,806,939
[45] Apr. 23, 1974

[54] PLURAL CHANNEL, SINGLE CARRIER FM REMOTE CONTROL SYSTEM

[75] Inventor: Joseph Palmieri, Deep River, Conn.

[73] Assignee: Westport International, Inc., Milford, Conn.

[22] Filed: Feb. 8, 1972

[21] Appl. No.: 224,502

[52] U.S. Cl. ............................. 343/225, 178/66
[51] Int. Cl. ............................................ G08c 15/10
[58] Field of Search ........................ 343/225–228; 178/66, 69.5

[56] References Cited
UNITED STATES PATENTS
3,454,927  7/1969  Dame et al. ..................... 343/225
3,273,128  9/1966  Ruthazer ......................... 343/225

Primary Examiner—John W. Caldwell
Assistant Examiner—Marshall M. Curtis
Attorney, Agent, or Firm—Ernest M. Junkins

[57] ABSTRACT

A system for individually adjusting a plurality of remotely controlled servo units according to the adjustment of a manual control for each unit by transmitting an FM carrier signal that is broken into a plurality of segments or pulses with each pulse having its frequency modulated according to the setting of a control. The controls are individually sequentially sampled for a voltage that is related to their setting, which voltage modulates the pulses sequentially and with the sampling being continuously repeated. An FM receiver decodes the modulated signal in each pulse and transmits it to its respective controlled unit as a voltage to which the controlled unit adjusts.

12 Claims, 4 Drawing Figures

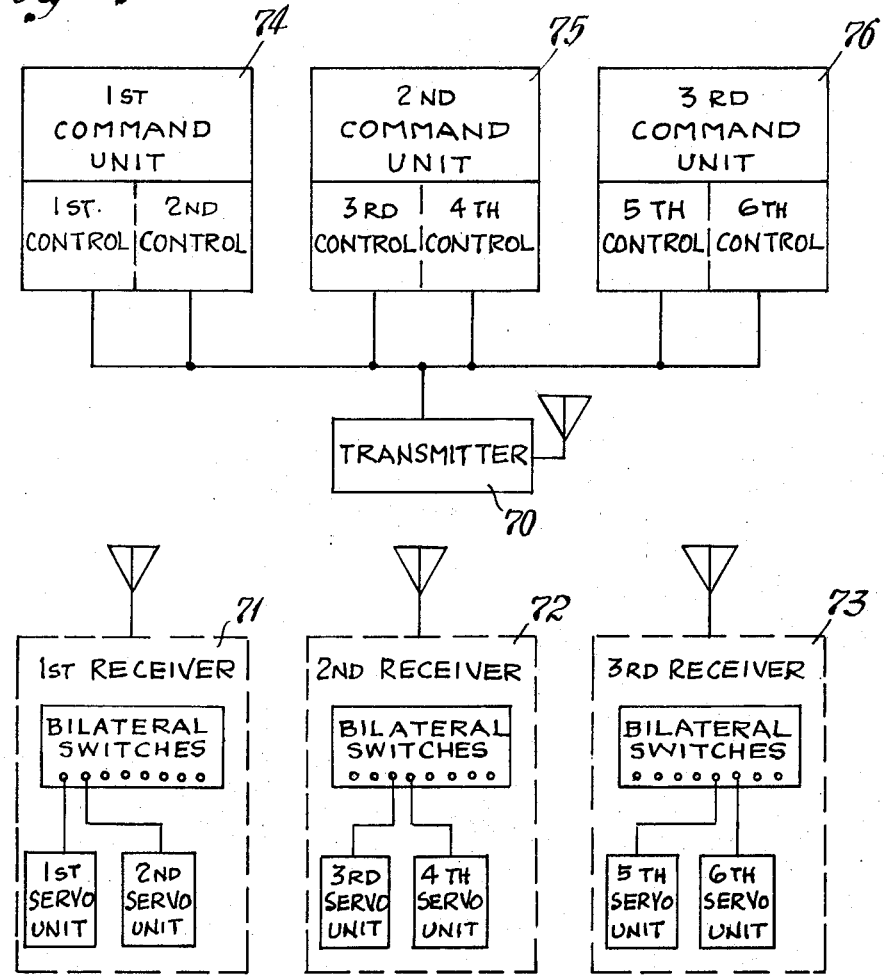

PLURAL CHANNEL, SINGLE CARRIER FM REMOTE CONTROL SYSTEM

In many applications it has been found desirable to remotely control servo units by radio waves from a remote transmitter. One such application has been in operating devices such as model airplanes, boats, autos, etc., and while the heretofore proposed systems have been found operable, they have not been found completely satisfactory especially when complying with government regulations. The regulations limit the systems to operating at a very limited number of carrier frequencies, as for example in the usual 27 $MH_z$ band, there are only five permitted carriers and the 72 $MH_z$ band has seven carrier. Moreover, each carrier has heretofore been capable of operating only a few servo units which prevented one carrier from normally operating more than one device as each device usually has two or three servo units. Thus, no more than five or seven different devices, each with its own transmitter operating at its own carrier frequency could be used simultaneously at the same location, which severely limited group activities of users.

In addition, the regulations required that if the transmitted power is beyond a minimum value, that a license is mandatory as most heretofore systems had to be operated at greater than the minimum power in order to provide sufficient range, transmitting and responding accuracy and interference isolation, a license was normally required.

It is accordingly an object of the present invention to provide a remote control system which through using only one carrier frequency is capable of providing control over a large number of different servo units.

Another object of the present invention is to provide a remote system that is less susceptible to distortion, transmitting and responding inaccuracies and spurious voltages and signals than heretofore proposed systems.

A further object of the present invention is to achieve the above objects with a remote control system that is capable of providing satisfactory operation even as to range with less than the minimum power requiring a license.

Another object of the present invention is to achieve the above objects with a remote system that is relatively economical to manufacture and durable in use by being susceptible to using integrated circuits and which may be easily modified to operate at any one of the different carrier frequencies.

In carrying out the present invention, the remote control system includes a transmitter that transmits an FM carrier signal at one of the alloted frequencies which may be in the 27 $MH_z$ band or in a different permitted band if desired. A plurality of manually adjustable controls such as an adjustable potentiometer each provide a voltage that is related to its present position to the transmitter. The latter divides the carrier into a continuously repeating sequence with each sequence having a plurality of spaced segments or pulses with there being at least one segment for each unit. The voltages of the controls are sampled and applied sequentially to the segments to modulate the frequency of each segment according to the voltage from its control. With each continuously repeated sequence, each voltage representing the instant position of only its control is sampled and utilized to modulate the frequency of its respective segment.

The receiver is connected to a plurality of servo units that are responsive to or react to the value of a control voltage. One type of such a servo unit is a reversible electric motor that will achieve a position dictated by the value of a control voltage applied thereto. Each settable control has a corresponding responsive servo unit and the receiver decodes the transmitted wave according to its segments so that each servo unit is made responsive to the segment which its respective control modulates by the frequency modulated segment being converted to a voltage and applied to its respective servo unit. The unit will thus in turn react to the value of this applied voltage to provide the movement or position dictated by the value of the control voltage which modulates the frequency of the carrier for its segment.

As the carrier may have a large number, i.e., from perhaps six to 16 segments in each sequence, one carrier can operate this number of controls and servo units. The units may all be located in a single device or may be separated into a number of devices each having a few (2 or 3) units, thus permitting a plurality of devices to be operated at the one carrier frequency from one transmitter. Moreover, the use of frequency modulation to carry the position or voltage information, provides for accurate transmitted reception and responding of the information and because the carrier is broken into segments a relatively large range is achieved even with only a small amount of average transmitted power.

Other features and advantages will hereinafter appear.

Referring to the drawing

FIG. 4 is a block diagram showing operation of a plurality of devices each having two servo units by one transmitter.

Figure 1:
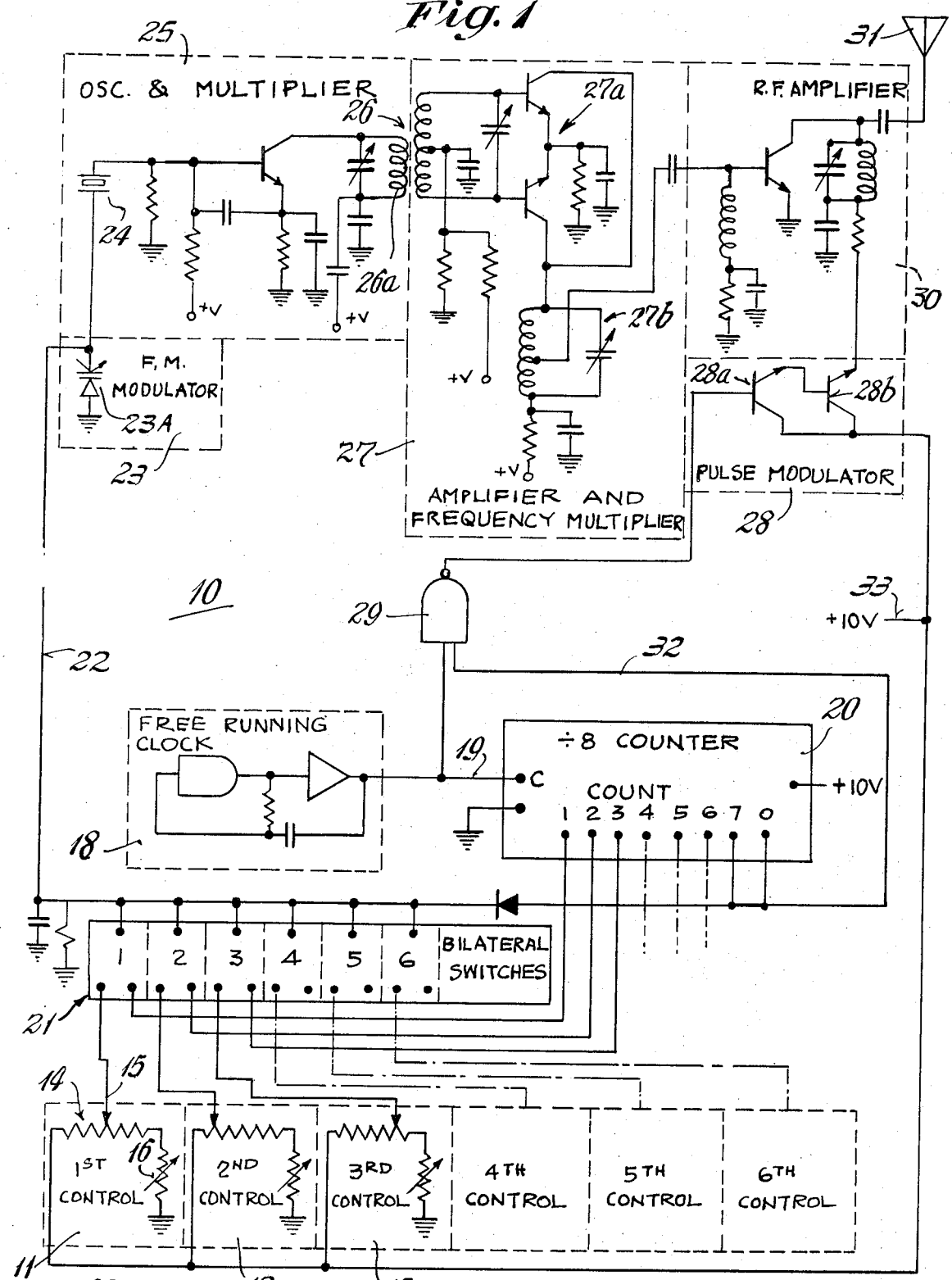
FIG. 1 is a block and schematic diagram of the controls and transmitter of the present invention.

Referring to the drawing, FIG. 1, the transmitter of the present invention is generally indicated by the reference numeral 10 and it transmits information of the adjustment of a first control 11, a second control 12, a third control 13, etc., with there being in the specific embodiment herein described six controls. Each control is identical and referring to the first control 11, it includes an adjustable resistor 14 having a manually or otherwise movable tap 15 on which a voltage appears that is related to the location of the tap on the resistor. In addition, a trimmer resistor 16 may be provided if desired, to initially adjust the voltage value range and correlate voltage with location of the tap.

Figure 2:
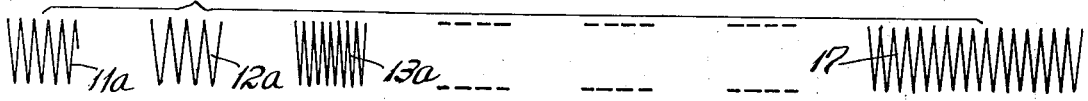
FIG. 2 is a view of one sequence of a continuously repeated wave that is transmitted.

Shown in FIG. 2 is one sequence of the wave transmitted by the transmitter 10 with the sequence being divided into a plurality of segments with there being one segment for each control. The transmitter wave is a frequency modulated wave and the information carried by each segment for its control accordingly has its frequency modulated in accordance with the setting of its respective control device as represented by its voltage.

Accordingly, the segment 11a is used to provide transmitter information of the position of the tap 15 of control 11, segment 12a to transmit information of the setting control 12, segment 13a to transmit information of the setting of control 13 and the three following segments shown in dotted lines being utilized to provide information for the fourth, fifth and sixth control settings. Each of the segments is followed by a gap or nontransmittal of the wave which may be of essentially the same duration as each segment with one embodiment having a ratio of 40 percent segment to 60 percent gap. Further, the one sequence of the wave shown includes a reset segment 17 which is double the width of the other segments and without a gap or discontinuous portion. The sequence of the same number of segments and a reset segment is continuously repeated at any desired rate such as, for example, about 200 times per second.

The frequency of the repetition of the sequence is dependent upon the repetition rate of a free running clock 18 which produces on a lead 19 womewhat square wave pulses which, for example, may be at a frequency of $1.5KH_z$. The lead 19 is connected to the clock terminal C of a "divide by 8" counter 20 having count terminals number 1 through 0. With each pulse on the clock terminal C from the clock 18, the counter will advance its count by one with the count terminal that represents the count of the counter having a high + voltage so that there is only one count terminal with a high + voltage at any one time. As it is a divide by 8 counter, it will repeat the counting sequence every eight clock pulses. Count terminals 1 through 6 of the counter 20 are respectively connected to input terminals of six bilateral switches, generally indicated by the reference numeral 21. Each switch is numbered and only its input terminal is connected to the correspondingly numbered count terminal of the counter 20. The control terminal of each bilateral switch is connected to the tap of its associated or similarly numbered control so that, for example, bilateral switch 1 has its input terminal connected to the count 1 terminal of counter 20 and the tap 15. Similarly for the bilateral switch 2, its input terminal is connected to the count 2 terminal of counter 20 and the tap from the second control 12. Accordingly, by the use of six bilateral switches though, of course, more or less may be used if desired, six separate controls may be sampled sequentially, The bilateral switches 21 are of type CD4016A while the divide by eight counter 20 may be a type CD4022A and the clock 18 a type CD4000AE, all being integrated circuits presently available from RCA Corp., Somerville, N.J.

The output terminals of each of the bilateral switches are connected in parallel to a lead 22 and it will be understood that the lead 22 for the duration that the counter has a count of 1, has a voltage related to the setting of the tap 15, has a voltage related to the setting of the second control only while the counter has a count of two, has a voltage related to the setting of the third control for the duration that the counter has a count of three, etc., so that there is applied on the lead 22 voltages which are related to the setting of the controls with each being sequentially sampled.

The lead 22 is connected to an FM modulator 23 which in turn produces a voltage variable with the voltage on the lead 22 on a crystal 24 of an oscillator and multiplier 25. The FM modulator includes a varactor 23a for permitting initial adjustment. The output of the oscillator and multiplier 25 is on a coil 26a of a transformer 26 and it consists of an FM signal having a carrier frequency that is three times the frequency of the crystal 24 for the 72 $MH_z$ band carrier frequencies and the frequency of each portion is modulated about the carrier frequency in accordance with the setting of the control that is determined by the count of the counter.

Connected to receive the signal on the transformer 26 is an amplifier and frequency multiplier 27 which amplifies the frequency modulated signal and also doubles its frequency by the use of a push-push amplifier 27a and a tuning circuit 27b that is tuned to the sixth harmonic of the frequency of the crystal 24.

The amplified and frequency multiplied continuous signal is broken into the segments 11a, 12a, 13a, etc., by the use of a pulse modulator 28 that is connected to the lead 19 through an AND gate 29.

The clock pulses have essentially equal duration of both a high + voltage and a low (i.e. 0) voltage and during the high voltage interval the + voltage is passed through the pulse gate 29 to the base of a transistor 28a of the pulse modulator 28 to effect conduction thereof and simultaneously therewith conduction through the emitter collector circuit of another transistor 28b. The transistor 28b is connected between the positive source of voltage and the power input to an RF amplifier 30. For the low or essentially zero voltage portion of each pulse, the transistor 28b is prevented from conducting and hence the RF amplifier 30 will not be supplied power and hence will not pass a signal to an antenna 31. In the high voltage portion of each pulse the amplifier 30 functions to increase the amplitude of the modulated FM carrier signal and supply the same to an antenna 31 by which it is transmitted.

It will be appreciated that by having the lead 19 connected to both the pulse modulator 28 and to the clock terminal C of the counter 20, that synchronization is achieved between the conduction through the bilateral switches and the segment which is modulated according to its respective control.

The count terminals 7 and 0 of the counter 20 are also connected to the base of the transistor 28a through the gate 29 and for the duration that both count terminals 7 and 0 are high, which is effectively two counts of the counter 20, the gate 29 supplies a positive voltage to the base of transistor 28a enabling power to pass through conducting transistor 28b from the +10 voltage source 33 to the RF amplifier 30 to provide the reset segment 17 of the sequence. The joined count terminals 7 and 0 are also connected to the lead 22 through a blocking diode to provide the value of a voltage signal which maintains the carrier at the selected carrier frequency.

After providing six control segments and one reset segment, the same sequence is repeated so that the wave transmitted by the antenna 31 is essentially a continuous repetition of the sampling of the control devices.

Figure 3:
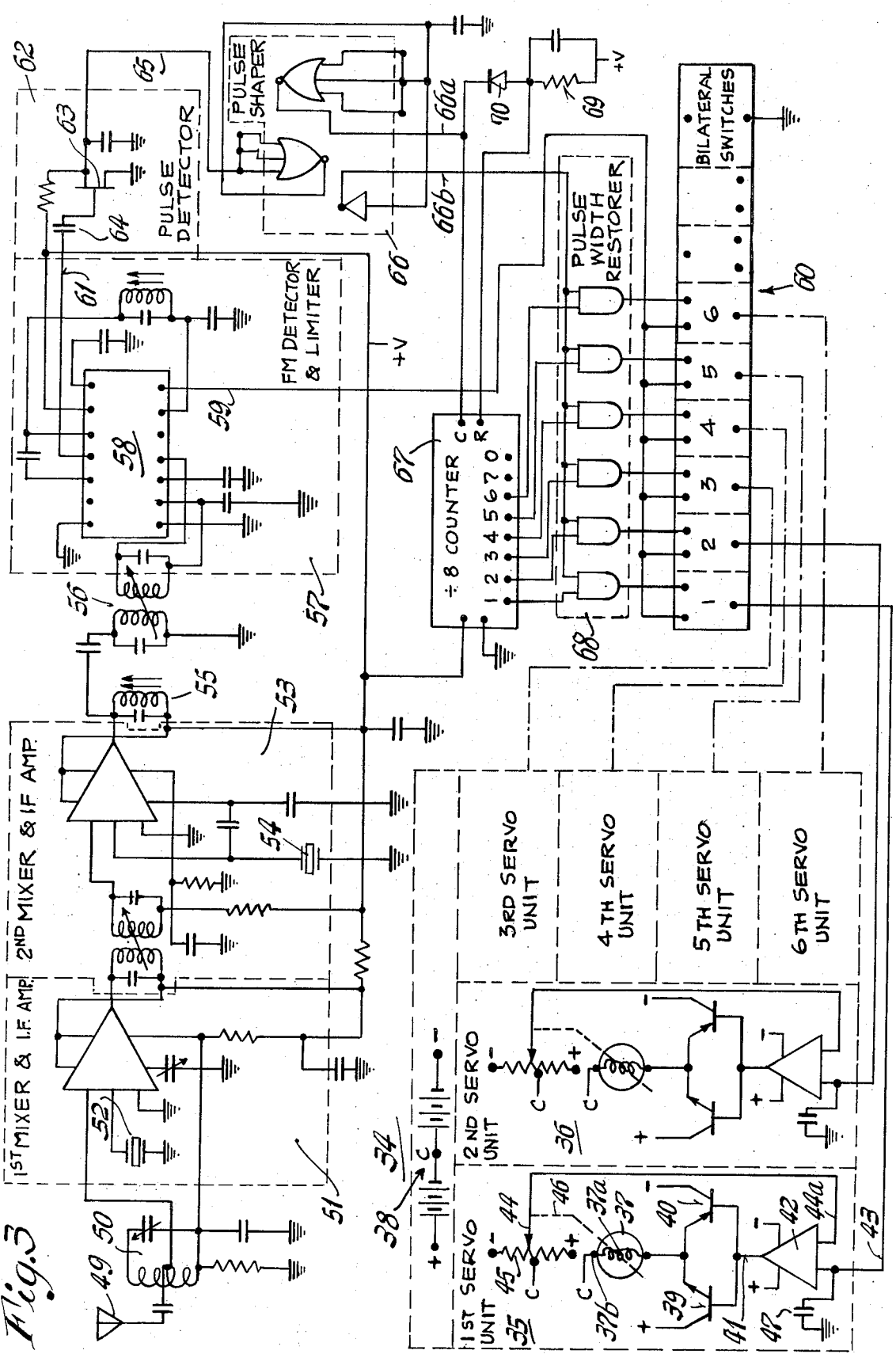
FIG. 3 is a block and schematic diagram of the servo and receiver.

Referring to FIG. 3, there is shown a receiver generally indicated by the reference numeral 34 which utilizes the transmitted wave to effect operation of a first servo unit 35, a second servo unit 36 and four additional servo units. There are the same number of servo units as there are controls and each have similarly numbered control functions to control the same numbered servo unit though, of course, if desired, there may be a lesser number of servo units and controls and that one control may operate more than one servo unit. Referring to the first servo unit 35, while this may have any desired construction which provides movement or position related to a control voltage, in the present instance each servo unit includes a reversible electric motor 37 having a winding 37a that has one end 37b connected to a center tap of a power source generally indicated by the reference numeral 38. The other end of the winding 37a is connected to a common junction of two emitters of transistors 39 and 40.

the collectors of the transistors 39 and 40 are connected to the plus and minus terminals of the power source 38 as indicated. The bases of the transistors are connected to an output 41 of an operational amplifier 42 (such as type 3G741, available from Silicon General, Westminister, California) having a first input connected to a lead 43 on which a control voltage is applied. Another input 44a to each amplifier 42 is obtained from a tap 44 adjustably movable over resistor 45 with the tap 44, as shown by dotted line 46, being connected to the output of the motor 37. The motor accordingly, as it turns will also move the tap 44 and apply to the input 44a of the amplifier 42, a voltage that is related to its setting and which may be either plus or minus or at the common potential. The voltage on the input 44a is thus directly related to the position of the motor 37.

It will be understood that with a positive voltage applied, for example, to the lead 43 and if the voltage on the lead 44a is less, the amplifier 42 will provide an amplified voltage on the lead 41, which will cause transistor 39 to conduct and drive the motor 36 in the direction which moves the tap 44 in the + direction. Movement will continue until the tap 44 produces on the input 44a a voltage which is equal to the voltage on the lead 43. The motor will be prevented from being energized to produce further movement by the transistor 39 being rendered non-conducting by the failure of a voltage on the lead 41. Similarly for movement in the opposite direction, i.e., when the potential on lead 43 is negative with respect to the potential on lead 44, the transistor 40 is rendered conducting to effect movement of the motor in the other direction and a movement of the tap 44 toward the negative terminal until the two input voltages are equal.

The lead 43 receives a voltage only for the duration that the segment 11a exists and in order to maintain a continuous voltage to the amplifier 42, there is provided a holding condenser 47 connected between lead 43 and ground with the condenser 47 accordingly maintaining essentially the value of the voltage determined by the modulated frequency of the segment 11a for the time between first segments 11a.

The other servo units 2 through 6 are similarly constructed and will provide accordingly, a movement of their respective motors depending upon the value of the control voltage thereto. Each motor may be used to operate movable parts of a device, such as rudder, throttle, elevator, etc., of a model airplane, if desired.

The receiver 34 has an antenna 49 for receiving the transmitted wave and directs the signal to a tuned circuit 50 that is broadly tuned to the FM band having the carrier frequencies. The signal from the tuned circuit is introduced to a combined first mixer and intermediate frequency amplifier 51. The amplifier includes a crystal 52 which is the channel determining crystal and has a frequency of 10.7 KH$_z$ less than the frequency of the carrier so that there is introduced into a second mixer and IF amplifier 53 an intermediate frequency, which is within a range of plus or minus 455 KH$_z$ away from the frequency determined by the crystal 52. The second mixer 53 includes a crystal 54 tuned to this intermediate frequency.

The amplifiers diagrammatically shown amplifiers 51 and 53 are preferably integrated circuits type CA3028 preferably available from RCA Corp.

The output of the second mixer and IF amplifier 53 is introduced into a pair of intermediate frequency tuned circuits 55 and 56 which provide for double tuning in order to enable band width selectivity before introduction of the signal into an FM detector and limiter 57 which includes an integrated circuit package 58 which may be of type ULN–2111A available from Sprague Electric Company, North Adams, Massachusetts.

The package 58 accepts the signal from the tuned circuit 56 and produces on an output lead 59 a voltage which is linearly related to the modulated frequency of the transmitted wave which, as heretofore explained, is related to the setting of the controls. The voltage at the output lead 59 is applied to the input terminals of six bilateral switches generally indicated by the reference numeral 60 and numbered 1 through 6. In addition the package 58 has a terminal to which a lead 61 is connected and which produces a positive voltage whenever there is a modulated signal received from the circuit 56.

The lead 61 is connected to a pulse detector 62 having a field effect transistor 63 with the voltage in the lead 61 being applied through a condenser 64 to the gate thereof. The source of the transistor 63 is connected to ground while the drain is connected to a positive voltage source on the package 58. When a signal resulting from a segment appears in the lead 61, the voltage on a lead 65 connected to the drain of transistor 63 increases in positive value by reason of the transistor 63 being rendered non-conducting and it maintains this positive voltage while the transistor 63 is non-conducting so that the positive voltage corresponds to the extent of the duration of each segment.

Upon a gap or lack of a transmitted signal appearing between the segments, the lead 61 is no longer positive, the transistor 63 becomes conducting and the lead 65 becomes less positive. Thus the lead 65 has in effect pulses thereon which correspond to the segments.

However, in order to produce substantially identical pulses having constant characteristics there is provided a pulse shaper 66 that receives the pulses on the lead 65 to produce on a lead 66a, essentially square wave pulses corresponding to the segments. The shaper 66 as shown includes NAND gates together with an inverting amplifier, the latter providing an output on a lead 66b. One form of shaper which may be employed is type CD4001, available as an integrated circuit from R.C.A.

Another divide by eight counter 67 has a clock terminal C that is connected to the lead 66a and thus the counter 67 will change its count by 1 for each pulse when the lead 66a changes from a low voltage to a high positive voltage. The counter 67 also has count terminals 1 through 0 with the terminals 1 through 6 being respectively connected to the control terminals in similarly numbered bilateral switches 60 through a pulse width restorer 68 having an AND gate for each of the counts 1–6 with the gate for each count having the same numeral. Each AND gate has two inputs with one input being from the corresponding count terminal of the counter 67 and the other input being from the lead 66b, the latter being common to all gates. The pulse width restorer limits the signals to the bilateral switches 60 to a time that substantially approximates the width of a segment to thereby prevent any overlapping of the voltage signals and counts in the bilateral switches. The output of the bilateral switches are connected to similarly numbered servo units.

Thus, with the first segment of a sequence the package 58 will produce on the lead 59, a voltage which has a value related to the setting of the control 11 and with the counter 67 having a count of 1 there will be an output voltage only from the bilateral switch 60 numbered 1 which becomes the input voltage on the lead 43 to the servo unit 35. This input voltage also has a value related to the control 11 voltage and only exists for the time that both the count of the counter 67 is 1 and the duration of the segments 11a. However, it will have sufficient time, i.e., the extent of the segment, to effectively charge the condenser 47 to its value thereof so that the charge will be maintained until the same segment appears in the next sequence. At the end of the segment 11a, the transistor 63 conducts, and the voltage in the lead 65 goes essentially to ground.

At the beginning of the next segment 12a, the transistor 63 is rendered non-conducting producing in the lead 65 a positive pulse to the pulse shaper which after essentially squaring it feeds it to the counter 67 clock terminal C to cause the counter to assume a count of 2. The package 58 produces in the lead 59 a voltage related to the value of the frequency modulated second segment 12a and only the bilateral switch numbered 2 will conduct for the duration of this segment which will cause the voltage on the lead 59 to be directed only to the second servo unit 36. Similarly with each of the remaining segments 3 through 6 of the sequence, the counter will advance its count and the bilateral switches will direct the voltage on the lead 59 only to the similarly numbered servo units.

After the counter 67 has reached a count of six, the next segment is the reset segment 17 which resets the counter 67 to a count of 1 by the application of a reset voltage to its terminal R. This is achieved basically by an RC network 69 connected to the positive voltage source and through a diode 70 to the lead 66a. With each segment, the capacitor becomes charged but the time constant of the RC network is such that the charge does not reach the voltage value required to effect resetting for each of the control pulses. However, as the reset pulse is longer, the charge on the capacitor has a longer time to increase in value and will attain during the reset pulse a voltage value sufficient to effect resetting of the counter 67. Thus when the segment 11a of the next sequence appears, the counter will have a count of 1. Thus the reset segment 17 assures that the counter in the receiver will at the beginning of each sequence have the same count as the counter 20 in the transmitter.

While the above-described embodiment has shown six controls and six servo units, it will be understood that a larger number may be employed if desired by utilizing a higher count counter and also by having a bilateral switch for each control and servo unit. Thus, the present invention contemplates having perhaps sixteen controls and servo units operating on a single carrier frequency.

Shown in FIG. 4 is a diagrammatic representation of a manner in which one transmitter 10, such as shown in FIG. 1 may be used by three different individuals to control three separate devices. One device has the receiver 71 and it is under the command of a first command unit 74, the second device has the receiver 72 and it is under the command of a second command unit 75 and the third device has the receiver 73 and it is under the command of a third command unit 76. Each command unit has two controls, labeled first and second for the command unit 74, and the receiver 71 is identical to the receiver shown in FIG. 3 with the exception that it only includes the first and second servo units. The remaining terminals of the bilateral switches and/or counter that are used for the other servo units are not connected. Similarly, the receiver 72 is identical to the receiver in FIG. 3 with the exception that only the third and fourth servo units are present and the other terminals of the bilateral switches are not used while the receiver 73 has only the fifth and sixth servo units and only bilateral switches numbered 5 and 6 are used.

With this manner of interconnecting a plurality of devices and command units it will be understood that the individual operating the first command unit can remotely operate only the device or model which has the receiver 71 while another individual through the use of the second command unit 75 may control through the same transmitter 70 another model which has the receiver 72 therein while a third individual through the use of the third command unit 76 and also through the same transmitter 70 may control a third model that has a third receiver unit 73 therein. Accordingly, by the use of just one transmitter operating on only one of the carrier frequencies, a multiplicity of separate devices may be individually controlled without altering the structure of the transmitter and by essentially having the same receiver unit for each of the individually controlled models.

Though the embodiment shown in FIG. 4 has only two servo units in each device, if desired one or more than two may be present in each device.

It will be understood that by changing the frequency of the crystal 52 in the receiver 34 and perhaps adjusting the circuit 50 that the receiver may be shifted from one carrier frequency to another while the transmitter, to be shifted to a new frequency requires basically only a change of the crystal 24 and perhaps slight returning of the tuning circuit 27b.

It will accordingly be appreciated that there has been disclosed a plural channel remote control system which utilizes a frequency modulated signal to transfer information from a plurality of controls to a plurality of servo units in a receiver.

A transmitter is connected to the plurality of controls and each of the controls provides an indication of its setting as by a voltage and this voltage is made to modulate the frequency of the transmitter carrier wave. The transmitter breaks up the carrier wave into a plurality of segments with there being at least one segment for each control and only enables each control to modulate the segment of the carrier with which it is associated.

In the receiver the carrier wave is decoded to provide a voltage related to each of the frequency modulated segments and supplies such voltages to respective servo units which respond thereto by movement and/or position. Thus the use of both frequency modulation of a carrier frequency and the breaking of the carrier wave into continuously repeated sequence with each sequence having at least a segment for each control and servo unit enables the system of the present invention not only to transmit information accurately even when operating below the minimum average power requirements requiring a license over a large range but it also enables each system to control a substantial number of different servo units.

Variations and modifications may be made within the scope of the claims and portions of the improvements may be used without others.

I claim:

1. A remote control radio system comprising a plurality of adjustable controls with each control supplying a voltage signal related to its adjustment, a radio transmitter for transmitting a radio wave at a carrier frequency including a variable frequency oscillator whose frequency sets the frequency of the radio wave, said oscillator changing its frequency in response to the value of the voltage signal resulting in direct modulation of the carrier frequency, means for subdividing the radio wave into a continuously repeatable sequence with each sequence having a plurality of segments, each of said sequences having at least one segment for each control, means for connecting the same control to the oscillator for the same segment in each sequence to modulate the frequency of the segment in accordance with the value of the voltage signal from the connected control and for connecting each control for a segment in a sequence; a device located remotely from the transmitter and having a plurality of servo units with the number of servo units at least equaling the number of controls, a receiver in the device having an antenna for receiving the transmitted wave and for demodulating the frequency of each segment into a signal that is related in value to the voltage signal of the control that modulated the segment and means for directing the demodulated signal from the same segment in each sequence to the same servo unit with each servo unit receiving at least the signal from one segment whereby each of said servo units provides a response related to the value of the demodulated signal that it receives.

2. The invention as defined in claim 1 in which the means for connecting in the transmitter includes an indexing means for sequentially shifting the control signals to each successive segment in the sequence and in which said receiver direction means includes a similar indexing means for sequentially directing successive demodulated signals to the servo means.

3. The invention as defined in claim 2 in which the transmitter indexing means is responsive to an electrical pulse for effecting indexing, and in which the means for connecting in the transmitter includes means for supplying a train of pulses.

4. The invention as defined in claim 3 in which the receiver indexing means is responsive to an electrical pulse for effecting indexing and in which the receiver directing means includes means for detecting each modulated segment and supplying a pulse to the receiver indexing means for each segment so detected.

5. The invention as defined in claim 4 in which the modulated segments in each sequence are separated by a lack of a transmitted wave and in which detecting means detects each lack to provide the pulse.

6. The invention as defined in claim 2 in which each indexing means consist of a binary counter having stages for a maximum count at least equal to the maximum number of controls, each of said counts further having a reset state, means in the transmitter for coding a segment of each sequence to a condition unique from the other segments for each reset state of the transmitter indexing means and in which the means for directing includes means for detecting the uniquely coded segment and causing the receiver indexing means to be set to its reset state.

7. The invention as defined in claim 1 in which each servo unit includes means for maintaining the value of the demodulated signal for essentially the duration of a sequence.

8. The invention as defined in claim 7 in which each servo unit includes a reversible driving means, means for providing a servo signal related to the position of the driving means, means for comparing the values of the servo signal and the maintained signal and for effecting energization of the driving means to move the driving means in a direction that eliminates the difference between the two signals.

9. The invention as defined in claim 8 in which the means for energizing the driving means includes a center-tapped direct current supply, the driving means has a winding having one end connected to the center-tap and means for effecting connection of the other end to one or the other of the polarities of the direct current supply, depending on the direction of the deviation between the servo signal and the maintained signal.

10. The invention as defined in claim 8 in which each servo unit includes a resistance connected to the direct current source, a tap movable on the resistance at which the servo voltage appears and means connecting the tap to the driving means to effect movement of the tap upon movement of the driving means.

11. The invention as defined in claim 1 in which there are a plurality of individual devices, in which each device includes at least one servo unit, a receiver and directing means, each said directing means on each device only enabling control of the servo units on its own device whereby the same transmitted wave may be utilized to individually control a plurality of devices.

12. The method of transmitting control signals from at least two different controls to two different responsive units with a control controlling a responsive unit comprising the steps of providing a radio carrier wave of a selected frequency, amplitude altering the carrier wave to provide at least two distinct segments in the wave with the segments constituting a sequence and continually repeating the sequence with the same number of segments, modulating the frequency of the first segment of the carrier wave by the first control and the second segment of the carrier wave by the second control, transmitting the altered and modulated wave; and receiving the wave at a remote location with a receiver having the two responsive units, demodulating each segment to provide a control signal for each that is related to the carrier frequency thereof and translating the amplitude altered portion of each sequence into a directional control for guiding the demodulated control signal from each of said first segments to the first responsive unit and the demodulated control signal from each of said second segments to the second responsive unit.

* * * * *